Patented Feb. 27, 1923.

1,446,578

UNITED STATES PATENT OFFICE.

HARRY PAULING, OF BERLIN-GRUNEWALD, GERMANY.

PROCESS OF MAKING SULPHATES.

No Drawing. Application filed August 26, 1921. Serial No. 495,721.

*To all whom it may concern:*

Be it known that I, HARRY PAULING, a citizen of the State of Prussia, Republic of Germany, residing at Berlin-Grunewald, Germany, have invented a new and useful Process of Making Sulphates (for which I have filed application in Germany on January 27, 1920), of which the following is a specification.

In the manufacture of sulphates from metals which are readily soluble in sulfuric acid, the practice hitherto, has been to subject the metals to the action of sulfuric acid and oxygen. In carrying out a process of this kind, it has been usual to granulate the metals and to pour them into tower-shaped receptacles into which sulfuric acid was sprayed from above, while a current of air and of hydrogen was driven upwards from below. The solution thus produced was repeatedly sent through the tower until it had reached the predetermined degree of concentration and the sulfuric acid employed had been spent. This procedure, however, is objectionable by reason of its excessive duration, as well as for the reason that an amount of air, by far exceeding the theoretical demand, had to be blown in, carrying along with it a corresponding amount of hydrogen, and, finally, for the reason that large quantities of metals has to be constantly kept in the towers, thereby causing a considerable financial loss if the metal to be treated is a costly one, such as copper or nickel.

I am aware that it is known to add nitric acid to the sulfuric acid employed to dissolve metals, for the purpose of accelerating the process of dissolution; the nitric acid, in such case, delivering or supplying the oxygen necessary to produce the sulphate, due to the fact that it is itself reduced to nitrous oxide gases of a lower grade. This property of nitric acid, however, has not been employed in trade, as the reaction does not go to completion if there is no considerable excess of sulfuric acid present. But even in the presence of a sufficient excess of sulfuric acid the process of dissolution, which is rather rapid in the beginning, proceeds slower and slower, so that in consequence of the heat required a considerable amount of heat must still be supplied, such amount being further increased by the fact that the nitric oxides formed must be removed from the solution by a blast of air. This fact and the evaporation thereby caused require a considerable amount of heat; and there is the further objection that the nitrous gases, owing to the considerable amount of water which they contain, cannot be regenerated except to a very weak nitric acid. The latter is too dilute to be used again in the process, unless it be once more brought up to the required concentration, which would entail additional costs. Owing to all these difficulties, the use of nitric acid for the purpose described above has not been adopted commercially.

To do away with the objections above mentioned is the purpose of the present invention; and to attain such purpose, according to the improved process, the nitric acid is first caused to act alone on the metal, the said acid, if desired, being previously heated. Owing to such action, the change into the respective nitrate will, first, be effected. But this transformation will take place in a much shorter period of time than would have been the case in the presence of sulfuric acid. As soon as the reaction begins to decrease, the nitrate solution is separated from the metal in excess, whether there is still some nitric acid present or not; and, after maxing said nitrate with the required amount of sulfuric acid, the blowing out with air is carried out in order to remove all nitric oxides which may still be present. When the nitric acid, bound to the nitrate, has been replaced by sulfuric acid and thereby has become free, a mixture will be formed of a solution of sulphate and a strong nitric acid. The blast of air, accordingly, will not cause the escape of vapor of water and of nitrate gases, but the escape of strong nitric acid and nitric gases. Thus by the regeneration of the nitrate gases the result will not be a diminution but an increase of strength in the regenerated nitric acid. Now, on cooling down of the solution, the sulphate will will be eliminated, leaving a mother-liquor which consists of strong nitric acid, in which only a slight amount of sulphate and some nitrate, besides traces of sulfuric acid, are contained. The crystals are then separated from the mother-liquor and washed in a known manner, after which they are dried and constitute the finished product. The said crystals, however, may be subjected to a further or renewed crystallization, as a result of which crystals of a larger size will be formed.

The advantages and novel technical features of the described process, accordingly, consist in accelerating in a quite extraordinary manner the process of decomposition up to the point where the nitrate is formed, whereupon it is terminated without necessitating that the entire quantity of nitric acid be transformed; further in that the exhaustion of the nitric acid need not be followed up to the formation of the lowest stage of oxidation of the nitrogen, which would cause losses of nitrogen and, consequently, of nitric acid; and, finally, in that the nitric oxides may be regenerated to a height fully sufficient for the purposes of this process. The process of crystallization is likewise accelerated to an extraordinary degree, whereby the size of the apparatus required is considerably reduced.

In the following I shall describe the process as applied, by way of example, to the production of copper sulphate from metallic copper.

Within a receptacle made of stone-ware or other acid-proof material, provided with a cover and an outlet, a certain quantity of copper is deposited in a suitable form. This receptacle, the cover of which has been closed, is then filled with nitric acid of about 50% strength to about one-third of its height. The said nitric acid should only be heated to a moderate degree, as the temperature will soon rise in consequence of the reaction. A rapid reaction will at once begin, developing a great quantity of strong nitrous gases which are conducted to an absorption chamber where they are regenerated into nitric acid of about 50% strength in a known manner. When the rapid regeneration of the gases starts to decrease, which will take about half an hour with a receptacle holding 600 liters, the acid nitrate solution, having a temperature of about 70° C., is led off into another receptacle, wherein it becomes mixed for a short time with a gradual addition of sulphuric acid, under compression of air. The air saturated with vapors of nitric acid is likewise introduced into the absorption chamber. Within the second receptacle the nitrate is transformed into sulphate, and on now cooling down the receptacle, either with water or by continuing the air blast, the formation and separation of crystals of copper sulphate will begin. The period of blowing out and of crystallization will last about 30 minutes, during which time a fresh charge of nitric acid will be acting on more copper. The charge of copper should, of course, be completed by compensating for the amount consumed. The mixture of mother-liquor and of crystals is drawn off either by suction or by centrifugal force, and the crystals are freed from the mother-liquor and then washed in a known manner. As has been stated above, an addition of sulphuric acid will cause a change into sulphate and a corresponding amount of nitric acid will be set free. The nitric acid causes an intense reduction of the solubility of the copper sulphate within the mother-liquor; and moreover, as the crystallization of each molecule of copper sulphate deprives the solution of five molecules of water, it will be clear that the remaining nitric acid will possess a high degree of concentration. It contains, as has been mentioned before, only a small quantity of nitrate and of sulphuric acid and is in a state to be returned into the primary decomposition receptacle. The whole process of transformation of the given quantity of copper into sulphate will take not more than about an hour or less, whereas heretofore the same quantity could only be obtained within a period of from one-half to two months; that is, more than thousand times longer. If it is desired to obtain crystals of a larger size, the small crystals are subjected to a second crystallizing operation which may be performed in a known manner. A special advantage derived from such renewed crystallization consists in that the operation, which requires chambers of a larger size, is performed with a neutral solution, which produces perfectly pure crystals entirely free of any acid.

If it is desired to manufacture nickel sulphate, attention should be given to the fact that the crystallization requires seven molecules of water, so that the concentration of the nitric acid and the sulfuric acid must be calculated accordingly. The same remarks apply to the treatment of brass and other alloys; the concentration of the acids to be employed in every case should be calculated according to the amount of water required for the crystallization of the final product. Care should be taken to avoid equally a want of water and a surplus of water, and, further, attention should be given to the fact that by the final washing of the crystals small quantities of water will always enter into the process.

I claim:

1. A process of converting metallic substances which are insoluble or difficultly soluble in sulfuric acid into sulphates by the utilization of nitric acid, comprising the steps of causing concentrated nitric acid to act on the metallic substance under treatment until the greater part of the acid has been bound by the action; separating the strongly acidulated nitrate solution thereby formed from the metal in excess; mixing said nitrate solution with sulfuric acid; subjecting the resultant solution to crystallization; separating the crystals from said resultant solution; and washing said crystals.

2. A process of converting metallic substances which are insoluble or difficultly soluble in sulfuric acid into sulphates by the utilization of nitric acid, comprising the steps of causing concentrated nitric acid to act on the metallic substance under treatment; separating the nitrate solution thereby formed from the metal in excess; mixing said nitrate solution with sulphuric acid; subjecting the resultant solution to an air blast to remove all nitric oxides; cooling said resultant solution to cause the sulphate therein to crystallize out; separating the sulphate crystals; and washing said crystals.

3. A process of converting metallic substances which are insoluble or difficultly soluble in sulfuric acid into sulphates by the utilization of nitric acid, comprising the steps of causing concentrated nitric acid to act on the metallic substance under treatment; separating the nitrate solution thereby formed from the metal in excess; mixing said nitrate solution with sulphuric acid; subjecting the resultant solution to an air blast to remove all nitric oxides; cooling said resultant solution to cause the sulphate therein to crystallize out, leaving a mother-liquor consisting substantially of strong nitric acid; separating and washing the sulphate crystals; and returning the mother-liquor for use on a fresh charge of metallic substance.

In testimony whereof I have affixed my signature.

HARRY PAULING.